R. FLETCHER & R. RIGGIN.
NUT LOCK.
APPLICATION FILED MAY 14, 1912.
1,036,598.
Patented Aug. 27, 1912.
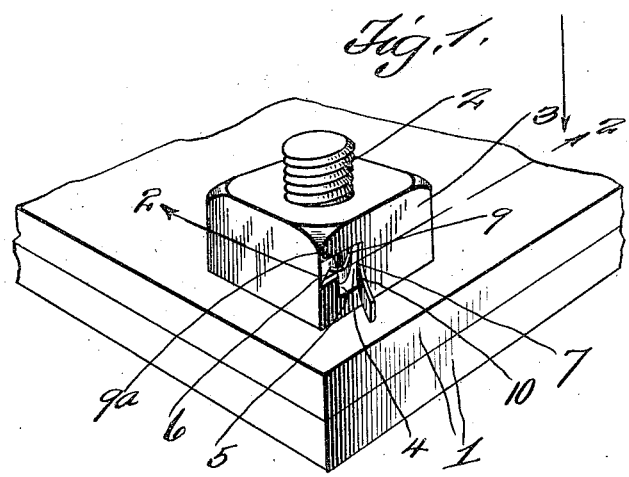
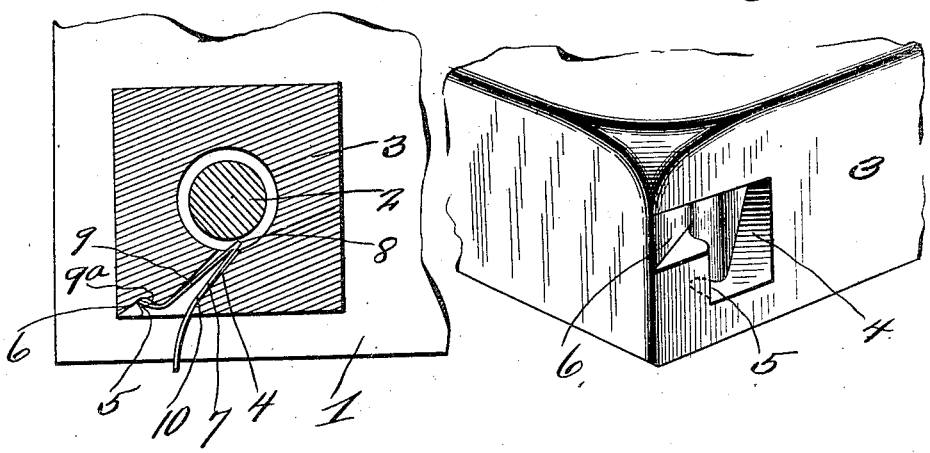
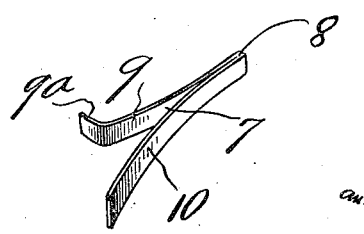
Witnesses
Francis G. Boswell,
Rohr Meyer.
Inventor
Robert Fletcher,
and Robert Riggin,
By D. Swift & Co.
Attorneys

UNITED STATES PATENT OFFICE.

ROBERT FLETCHER AND ROBERT RIGGIN, OF CROSSETT, ARKANSAS.

NUT-LOCK.

1,036,598.  Specification of Letters Patent.  Patented Aug. 27, 1912.

Application filed May 14, 1912. Serial No. 697,323.

*To all whom it may concern:*

Be it known that we, ROBERT FLETCHER and ROBERT RIGGIN, citizens of the United States, residing at Crossett, in the county of Ashley and State of Arkansas, have invented a new and useful Nut-Lock; and we do hereby declare the following to be a full, clear, and exact description of the invention, such as will enable others skilled in the art to which it appertains to make and use the same.

This invention relates to a new and useful nut lock.

The principal feature of construction is the provision of a detent spring member welded or otherwise bent upon itself to form two arms and insertible in an opening, which extends tangentially with relation to the central bore of a nut. One of the arms of the member terminating in a hook to enter a recess in the wall of the opening, while the other arm extends beyond a nut. The hooked end constituting means to hold the member in place.

The invention comprises further features and combination of parts, as hereinafter set forth, shown in the drawings and claimed.

In the drawings:—Figure 1 is a view in perspective showing the application of the improved nut lock. Fig. 2 is a sectional view on line 2—2 of Fig. 1. Fig. 3 is an enlarged detail view of a portion of the nut showing the outside open end of the opening with the recess. Fig. 4 is a detail view of the detent spring member.

Referring more particularly to the drawings 1 designates two plates, through which a bolt 2 extends. Threaded upon the bolt is a nut 3, which is of the usual construction. An opening 4 extends tangentially through the nut, in the wall of which adjacent its outer end portion a recess 5 is, constructed. Adjoining the recess 5 is a depression 6. A spring detent member 7 constructed of a piece of spring steel or other suitable metal is provided, for insertion in the opening so that the nose 8 thereof will engage the threads of the bolt, to prevent the nut from unscrewing. However, before the metal is tempered, the same is welded or otherwise bent upon itself to form the nose 8 and the two arms 9 and 10, the arm 9 terminating in a hook, which engages the recess 5, to prevent the member from displacement accidentally. When the member is arranged in the opening the two arms spread against two of the walls of the opening. To insert the member in the opening, the two arms of the member are pressed together, and the hooked end of one of the arms passes through the depression 6, then the arms spread apart against the walls of the opening, thereby holding the hooked end in the recess 5 and out of registration with the depression. The spring detent member will not prevent the nut from turning on the bolt, but when attempting to unscrew the nut, the nose 8 will bite into the threads, and thus prevent the unscrewing. To remove the spring detent member manipulate the projecting portion of one of the arms so as to bring the hooked end in registration with the depression, after which the member may be removed, thus allowing a nut to be unscrewed from the bolt.

The invention having been set forth, what is claimed as new and useful is:—

In combination, a nut having an opening extending therethrough and tangentially with relation to its central bore, the opening having a recess in its wall adjacent the outer open end of the opening, the opening having a depression adjoining the recess, a spring detent member welded upon itself to form two spring arms merging together to form a nose adapted to engage the thread of a bolt, one of the arms having a hooked end adapted to first pass through the depression, and then engage the recess to prevent displacement of the member.

In testimony whereof we have signed our names to this specification in the presence of two subscribing witnesses.

ROBERT FLETCHER.
ROBERT RIGGIN.

Witnesses:
J. E. LAWRENCE,
FRANK W. PUGH.

Copies of this patent may be obtained for five cents each, by addressing the "Commissioner of Patents, Washington, D. C."